May 12, 1970 R. E. SMITH 3,512,036

COLOR DISPLAY SYSTEM INCLUDING PROTECTIVE APPARATUS FOR A VOLTAGE SWITCHING CIRCUIT

Filed Oct. 20, 1967

United States Patent Office 3,512,036

Patented May 12, 1970

3,512,036

COLOR DISPLAY SYSTEM INCLUDING PROTECTIVE APPARATUS FOR A VOLTAGE SWITCHING CIRCUIT

Robert E. Smith, Richardson, Tex., assignor to Texas Instruments Incorporated, Dallas, Tex., a corporation of Delaware

Filed Oct. 20, 1967, Ser. No. 676,842
Int. Cl. H04n *9/22*
U.S. Cl. 315—14 9 Claims

ABSTRACT OF THE DISCLOSURE

Protective apparatus is disclosed for a color display system of the type in which the color of light emitted by a phosphor screen is changed by switching an electron accelerating voltage between different levels, the switching being performed by alternately triggering a pair of SCR's (silicon controlled rectifiers) which are connected so that they would shunt the supply current to the switching circuit if both should conduct simultaneously. The protective apparatus is operative to automatically deenergize the switching devices if this should happen. The protective apparatus includes a first transistor interposed between the SCR switching circuit and its energizing source and a second transistor for biasing the first transistor into conduction to an extent which varies as a function of the voltage applied to the switching circuit. Accordingly, when both SCR's conduct simultaneously and shunt the source current, the first transistor cuts off the supply of current to the switching circuit.

Figure 1:
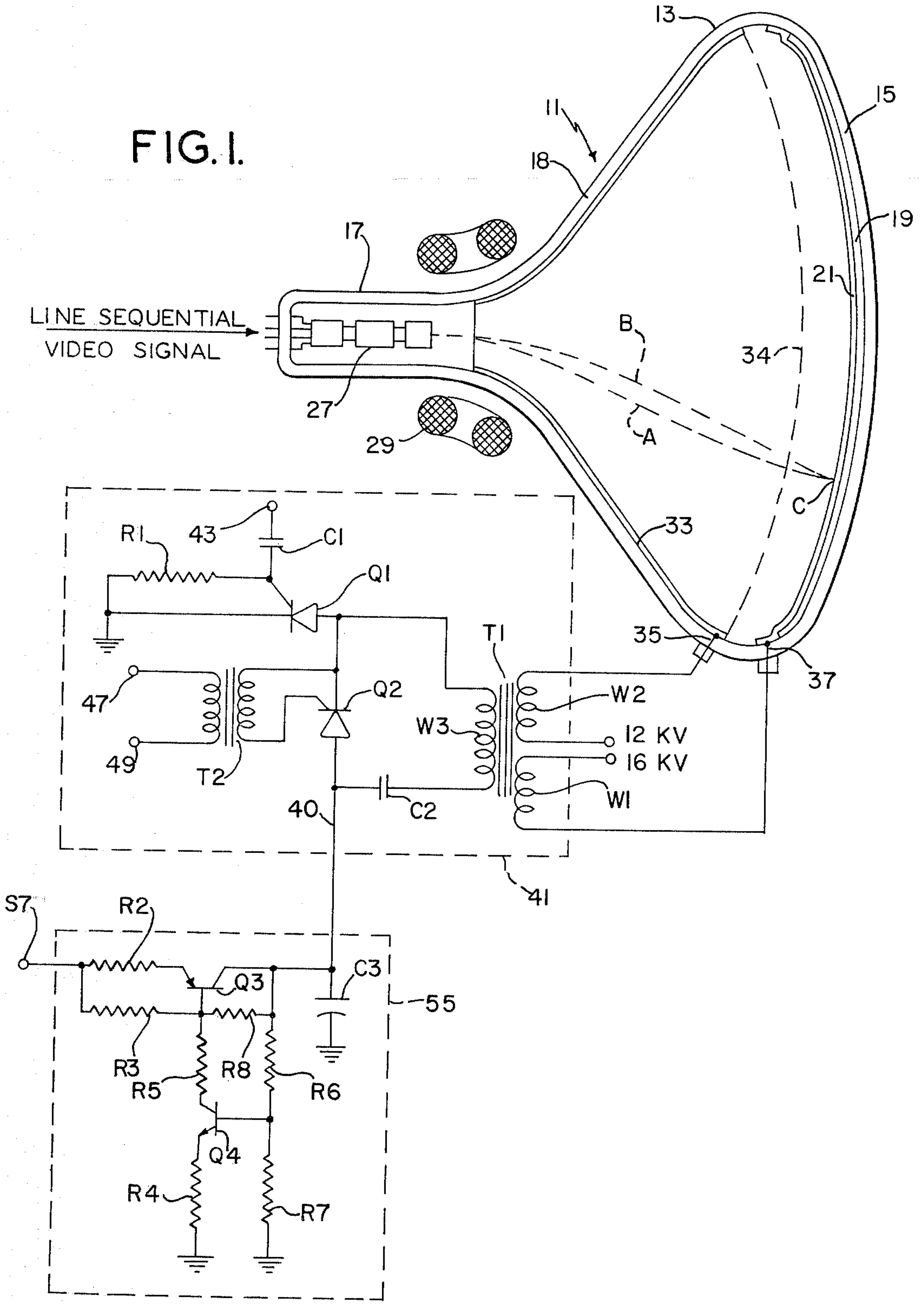

This invention relates to protective apparatus for a high voltage switching circuit in a color display system of the type in which the color of light emitted by a phosphor screen is changed by switching an electron accelerating voltage between different levels.

In color display systems of the type described above, voltage switching circuits are commonly utilized in which two or more SCR's are alternately triggered to switch the accelerating voltage between different levels. The usual connection of the SCR's causes them to substantially shunt the source current supplied to the switching circuit if, due to some malfunction, both of the SCR's should conduct simultaneously. In such a case, the switching circuit is in a so-called latched-up state in which neither of the SCR's can be turned off unless the source current is broken.

Among the several objects of the present invention may be noted the provision of apparatus for deenergizing switching devices in a color display system voltage switching circuit if both such devices conduct simultaneously; the provision of such apparatus which operates automatically; the provision of such apparatus which restores the switching devices to normal operation; the provision of such apparatus which is reliable; and the provision of such apparatus which is relatively simple and inexpensive. Other objects and features will be in part apparent and in part pointed out hereinafter.

Briefly, protective apparatus according to the present invention is useful in a color display system in which an electron accelerating voltage is switched between different levels to change the color of light emitted by a phosphor screen and in which the switching is performed by alternately triggering a pair of triggerable semiconductor current switching devices which are interconnected in a D.C. energizable switching circuit, the devices being connected to substantially shunt source current supplied to the switching circuit if both switching devices conduct simultaneously. The protective deenergizing apparatus includes circuit means for connecting the switching circuit to a D.C. source. The circuit means includes a first semiconductor amplifying device interposed between the switching circuit and the source for controlling the energization of the switching circuit. Means including a second semiconductor amplifying device are provided for biasing the first amplifying device into conduction to an extent which varies as a function of the amplitude of the voltage across the switching circuit. Accordingly, when the source current is shunted by simultaneous conduction through both of the switching devices, the first amplifying device cuts off the supply of current to the switching circuit to deenergize the switching devices.

The invention accordingly comprises the constructions hereinafter described, the scope of the invention being indicated in the following claims.

The accompanying drawing, in which one of various possible embodiments of the invention is illustrated, is a schematic circuit diagram of a voltage switching color display system employing protective apparatus of this invention.

Referring now to FIG. 1, there is indicated at 11 a color kinescope of a type with which the present invention is useful. Kinescope 11 includes a conventional glass envelope 13 having a screen portion 15, a neck portion 17 and a bell-shaped intermediate portion 18 connecting the neck and screen portions. Coated on the inner surface of the screen portion 15 is a phosphor screen or layer 19 which includes a phosphor material which emits light of different colors when struck by electrons of different energies. Phosphor screen 19 may, for example, be constituted by a mixture of two different kinds of phosphor particles one of which emits red light when energized by electrons having energies above a relatively low predetermined level and the other of which emits cyan light when energized by electrons having energies above a relatively high predetermined level. Such a screen will emit red light when struck by electrons at the relatively low level and will emit white or substantially achromatic light when struck by electrons at the relatively high energy level, which electrons can energize both of the phosphors. Such red-white image displays are known in the art for the presentation of color images and images so presented appear to have a relatively wide range of hues subjectively having a greater saturation than that which is actually present in the colorimetric sense. Methods of preparing phosphors useful in making such a screen are disclosed in copending application Ser. No. 459,582, filed May 28, 1965. Phosphor materials providing three different colors may also be used if appropriate electron accelerating voltage are also provided. Over phosphor screen 19 is deposited a film 21 of aluminum which is conductive and yet is also thin enough to be substantially electron permeable. By means of film 21 suitable electron accelerating voltages may be applied to the phosphor screen 19.

Within the neck portion 17 of envelope 13 there is mounted a conventional electron gun 27 for emitting a beam of electrons directed toward phosphor screen 19. For the purpose of the example described herein, it is assumed that this color display system is operated in a line-sequential mode. For this purpose a line-sequential, color video signal is applied to gun 27 for varying the electron beam current, that is, the rate at which electrons are emitted by the gun. The video signal thus controls the instantaneous brightness of the light produced by the beam on phosphor screen 19. It should be understood, however, that other modes of presentation, such as field-sequential, may also be employed by appropriately varying the different switching rates described hereinafter and applying a corresponding video signal to gun 27.

Electrons emitted from gun 27 pass through the magnetic influence of a deflection yoke 29. Yoke 29 is energized in conventional manner to deflect the beam of electrons in a scanning raster over the envelope face portion 15. However, as is understood by those skilled in the art, the raster will be of uniform size only if the electrons emitted by gun 27 are all accelerated to the same energy or if compensation is made for the different deflection effects experienced by electrons having different energies.

The inner surface of the part of the intermediate envelope portion 18 adjacent neck 17 is coated with a conductive band as indicated at 33 thereby to constitute a generally annular, horn-shaped electrode which is concentric with gun 27 and through which the beam of electrons emitted by the gun pass on their way to phosphor scheen 19. Band 33 may conveniently be constituted by a so-called "dag" coating on envelope 13. An electron-permeable conductive mesh screen 34 is supported adjacent to but substantially uniformly spaced from phosphor screen 19. Mesh screen 34 is in electrical contact with the dag coating constituting band 33. As is explained in greater detail hereinafter, mesh screen 34 and electrode band 33 are employed to exercise corrective effect on the deflection of the electron beam.

Electrical connections are made to the mesh screen 34 and to the phosphor screen 19 as indicated at 35 and 37 respectively and these connections extend through envelope 13 by means of conventional feed-through terminals.

Phosphor screen 19 and mesh screen 34 are provided with out-of-phase stepped voltages, and in particular with voltage waves of rectangular waveform and of several kilovolts amplitude, by the switching circuit indicated generally at 41. The operation of switching circuit 41 itself is explained in greater detail in the copending application of William H. Chingman, Jr., for Voltage Switching Apparatus for Color Kinescopes, Ser. No. 553,946, filed May 31, 1966. Switching circuits for providing three level, stepped voltage waveforms for three color displays are disclosed in the copending application of Charles F. Mankus for Apparatus for Generating a Stepped Voltage Waveform, Ser. No. 627,340, filed Mar. 31, 1967.

Phosphor screen 19 and mesh 34 are connected to respective secondary windings W1 and W2 of a transformer T1. The opposite ends of the transformer secondary windings are provided with respective D.C. biasing potentials. Appropriate nominal D.C. potentials for mesh 34 and screen 19 are approximately 12 and 16 kilovolts, respectively. Transformer T1 also includes a primary winding W3, one end of which is connected to ground through the anode-cathode circuit of an SCR (silicon controlled rectifier) Q1. Triggering signals applied to a terminal 43 are coupled to the gate terminal of SCR Q1 through a coupling capacitor C1. The gate is normally biased to ground through a resistor R1. The other end of winding W3 is connected to a direct current supply lead 40 through a D.C. blocking capacitor C2. Primary winding W3 and capacitor C2 together are shunted by the anode-cathode circuit of second SCR Q2. Triggering signals for SCR Q2 applied to a pair of terminals 47 and 49 are coupled to the gate-cathode circuit of the SCR by a transformer T2.

SCR's Q1 and Q2 function as triggerable semiconductor current switching devices for chopping the D.C. provided through lead 40 into an oscillatory waveform which is stepped up in voltage by transformer T1. When SCR's Q1 and Q2 are triggering alternately, the circuit 41 operates, as described in greater detail in the aforesaid copending application Ser. No. 553,946, to apply respective stepped voltage waveforms to the mesh 34 and to the screen 19, the two voltages being swtiched out-of-phase wtih each other. Electrons emitted by gun 27 during the different time intervals corresponding to the two different voltage levels of the waveform applied to screen 19 are thus accelerated to different energy levels before reaching phosphor screen 19. The energy levels are chosen in relation to the characteristics of the phosphors which make up screen 19 so that the lower energy electrons excite only the red phosphor while the higher energy electrons excite both the red and cyan phosphors thereby causing white light to be emitted.

The frequency of the rectangular wave is adjusted and synchronized by appropriately controlling the triggering of SCR's Q1 and Q2 so that the difference accelerating voltages are produced during periods which correspond to the sequencing of the color video signal applied to gun 27. The beam current is thus modulated to reproduce the various image components in their respective colors. In the example illustrated this is assumed to be at a line-sequential rate.

Registration is maintained between the different color image components in the following manner. During the display of a white line, the screen 19 is driven to the higher of its two potential levels and electrons emitted from gun 27 are accelerated to a relatively high energy level. These electrons thus produce white light when they strike the phosphor screen as explained previously. As the screen 19 is driven to its more positive voltage, the mesh 34 is driven to its more negative voltage level. Accordingly, electrons emitted from gun 27 during this period are not greatly accelerated as they first leave the gun but rather attain only a relatively low velocity in the region of the yoke 29. These electrons thus relatively highly subject to deflection by the yoke's field and therefore follow a path having an early high curvature as represented at A in FIG. 1. As these electrons pass through the mesh 34, however, they are subjected to a relatively intense electric field and are thus accelerated to approach screen 19 at a relatively steep angle, impinging at a point indicated at C.

When a red line is being displayed, the screen 19 is driven to the lower of its two voltage levels. The total acceleration experienced by electrons emitted by gun 27 during this line period is thus relatively small and only the red phosphor is energized. While the screen is at its lower voltage level, the mesh 34 is driven to the higher of its two voltage levels and thus electrons emitted from gun 27 are rapidly accelerated as they first leave the gun. These electrons are thus not greatly deflected in the region of the yoke and therefore follow a path substantially as indicated at B in FIG. 1. However, as screen 19 is then at the lower of its two voltage levels, these electrons are not greatly further accelerated after passing through mesh 34 and therefore approach the screen substantially at the angle determined by their earlier deflection striking the screen substantially at the same point C as the higher energy electrons following the path A.

As the particular configuration of kinescope 11 will affect the distribution of the electric field within its envelope, as will the boundaries of the electrode band 33 and the aluminum screen coating 21, it may be seen that the particular D.C. biasing voltages and the amplitudes of the steps between the two voltage levels applied to these elements will vary from tube to tube in order to achieve best registration. Typically, the amplitude of the steps between the two voltage levels will be different for the mesh 34 and the sceen 19.

During normal operation, as explained in the aforesaid copending application Ser. No. 553,946, the SCR's Q1 and Q2 are turned off by resonant interaction of the leakage inductances of transformer T1 with the capacitive load constituted by the screen 19 and mesh 34, the turn-off occurring at the end of the transition between successive voltage levels. Thus, during such normal operation, no more than one of the two SCR's Q1 and Q2 conducts at any given moment. It is possible, however, that electrical noise in the form of a short transient pulse or a malfunction in the triggering circuitry may cause both SCR's Q1 and Q2 to be triggered simultaneously. As the two SCR's are effectively connected in series across the supply voltage to the switching circuit 41, it can be seen by those skilled in the art that such simultaneous triggering will cause the two SCR's to effectively latch into a conductive state and to shunt the D.C supply current. If the supply current were not interrupted this latched up state could then exist indefinitely or until the overload caused by the shunt caused a component failure. A similar situation exists with the three level switching circuits mentioned previously.

To prevent damage and to automatically restore the switching circuit 41 to operation, the switching circuit is energized with direct current through a protective circuit designated generally at 55.

Positive direct current is supplied at a terminal 57 and is applied, through a resistor R2 and the emitter-collector circuit of a PNP conductivity type transistor Q3, to the switching circuit supply lead 40. Lead 40 is bypassed to ground through a filter capacitor C3. The base of transistor Q3 is connected to terminal 47 through a resistor R3. Transistor Q3 is operated as a current amplifying device for controlling the energization of the switching circuit 41 with which it is effectively connected in series and for this purpose is selectively biased into conduction by an NPN transistor Q4 which functions as an amplifying device of the complementary conductivity type. The emitter of transistor Q4 is connected to ground through a resistor R4 and its collector is connected to the base of transistor Q3 through a resistor R5. The collector-emitter circuit of transistor Q4 is thus effectively connected across the collector-base circuit of transistor Q3 and the D.C. input to the switching circuit 41. Conduction through transistor Q4 is in turn controlled in response to the voltage present at lead 40, that is, the voltage across the switching circuit 41, by a voltage divider comprising a pair of resistors R6 and R7. The divider applies to the base of transistor Q4 a voltage which varies as a function of or is proportional to the voltage applied to switching circuit 41. Since transistor Q4 controls conduction through transistor Q3, it can be seen that conduction through transistor Q3 is also controlled as a function of the voltage applied to switching circuit 41. A resistor R8 of relatively high value bridges the collector-base circuit of transistor Q3.

The operation of protective circuit 55 is substantially as follows. When the switching circuit 41 is operating normally, the voltage at lead 40 forward biases transistor Q4 which in turn forward biases transistor Q3. Conduction in transistor Q3 allows the switching circuit 41 to draw normal load current from the terminal 57.

If, however, some transient pulse or circuit malfunction should cause both SCR's Q1 and Q2 to conduct simultaneously, the resulting shunting of the current supplied to switching circuit 41 will pull the voltage at lead 40 to a very low value. The low voltage at lead 40 causes transistor Q4 to stop conducting which in turn turns off transistor Q3. When transistor Q3 stops conducting, the supply current to the switching circuit 41 is cut off and the SCR's Q1 and Q2 will cease conducting or will unlatch as understood by those skilled in the art. The capacitor C3 which is connected across the D.C. power input to switching circuit 41 prevents the voltage at lead 40 from rising so fast that the SCR's cannot fully complete their transition from a conducting to a nonconducting state. After the SCR's Q1 and Q2 have returned to a nonconducting state, the slight forward bias provided by resistor R8 produces sufficient conduction through transistor Q3 to cause the voltage at lead 40 to rise to a level such that the regenerative biasing of transistor Q3 provided by transistor Q4 again causes substantially the whole supply voltage to be applied to lead 40. The operation of the switching circuit 41 is thus free to resume under the control of the triggering signals applied to the SCR's Q1 and Q2.

In view of the above, it will be seen that the several objects of the invention are achieved and other advantageous results attained.

As various changes could be made in the above constructions without departing from the scope of the invention, it is intended that all matter contained in the above description or shown in the accompanying drawing shall be interpreted as illustrative and not in a limiting sense.

What is claimed is:

1. In a color display system in which an electron accelerating voltage is switched between different levels to change the color of light emitted by a phosphor screen in response to impinging electrons and in which said switching is performed by alternately triggering a pair of triggerable semiconductor current switching devices which are interconnected in a D.C. energizable voltage switching circuit, said devices being connected to substantially shunt the D.C. source current if both switching devices conduct simultaneously; apparatus for deenergizing said switching devices in the event that both switching devices conduct simultaneously, said apparatus comprising:

circuit means for connecting said switching circuit to a D.C. source, said circuit means including a first semiconductor amplifying device interposed between said switching circuit and said source for controlling the energization of said swithing circuit; and means including a second semiconductor amplifying device for biasing said first amplifying device into conduction to an extent which varies as a function of the amplitude of the D.C. voltage across said switching circuit whereby when the source current is shunted by simultaneous conduction through both of said switching devices, said first amplifying device cuts off the supply of current to said switching circuit to deenergize said switching devices.

2. Apparatus as set forth in claim 1 wherein said first and second amplifying devices are transistors.

3. Apparatus as set forth in claim 2 wherein said transistors are of complementary conductivity types.

4. Apparatus as set forth in claim 1 wherein said first amplifying device is a transistor of a first conductivity type the collector-emitter circuit of which is in series with said switching circuit across said load; wherein said second amplifying device is a transistor of conductivity type which is complementary to said first type, the collector-emitter circuit of said second transistor being connected across the collector-base circuit of said first transistor and said switching circuit; and wherein said apparatus includes voltage divider means connected across said switching circuit for biasing said second transistor into conduction to an extent which varies as a function of the voltage across said switching circuit.

5. Apparatus as set forth in claim 1 wherein said switching devices are SCR's which stop conducting when the source current to said switching circuit is cut off by said first amplifying device.

6. Apparatus as set forth in claim 5 including means for biasing said first amplifying device toward conduction when said SCR's stop conducting.

7. Apparatus as set forth in claim 6 including capacitor means connected across said switching circuit for delaying a rise in the voltage applied to said switching circuit when said SCR's stop conducting.

8. In a color display system having a phosphor screen which emits light of different colors in response to impinging electrons of different energies, apparatus for applying at least two different accelerating voltages to said screen, said apparatus comprising:

a step-up transformer having a secondary winding connetced to said screen and a primary winding inductively coupled to said secondary winding;

a first SCR connected in series with said primary winding;

a second SCR connected across said primary winding, said first and second SCR being thereby effectively connected in series, said SCR's being triggerable alternately to apply two different electron accelerating voltages to said screen;

circuit means for connecting said first SCR and said primary winding across a D.C. source, said circuit means including a first transistor having its collector-emitter circuit interposed between said SCR's and said source; and means including a second transistor for biasing said first transistor into conduction to an extent which varies as a function of the amplitude of the D.C. voltage across said SCR's whereby when the source current is shunted by simultaneous conduction through both of said SCR's, said first amplifying device cuts off the supply of current to said SCR's.

9. Apparatus as set forth in claim 8 including a capacitor connected across said SCR's for delaying a rise in the voltage across said SCR's when said SCR's stop conducting.

No references cited.

ROBERT L. GRIFFIN, Primary Examiner

A. H. EDDLEMAN, Assistant Examiner

U.S. Cl. X.R.

178—5.4